United States Patent [19]
Klausner

[11] Patent Number: 5,839,097
[45] Date of Patent: Nov. 17, 1998

[54] ELECTRICAL HOME APPLIANCE

[75] Inventor: Markus Klausner, Chemnitz, Germany

[73] Assignee: Robert Bosch GmbH, Stuttgart, Germany

[21] Appl. No.: 837,347

[22] Filed: Apr. 17, 1997

[30] Foreign Application Priority Data

Apr. 20, 1996 [DE] Germany ........................ 196 15 840.0

[51] Int. Cl.$^6$ .............................. G06F 1/16; G06F 13/10
[52] U.S. Cl. ...................... 702/188; 364/138; 364/708.1; 364/709.1; 340/825.06
[58] Field of Search ............................ 702/188; 364/138, 364/708.1, 709.1; 340/870.01, 870.11, 531, 533, 635, 825.06, 825.07, 825.72; 345/903; 439/594; 307/38–42

[56] References Cited

U.S. PATENT DOCUMENTS

| | | | |
|---|---|---|---|
| 5,436,510 | 7/1995 | Gilbert | 307/38 |
| 5,565,855 | 10/1996 | Knibbe | 340/825.06 |
| 5,570,085 | 10/1996 | Bertsch | 340/825.07 |
| 5,738,496 | 4/1998 | Mehta | 340/825.72 X |

FOREIGN PATENT DOCUMENTS 2 265 158  9/1993  United Kingdom .

OTHER PUBLICATIONS

Meinrad Happacher, "Das vernetzte Eigenheim", Elektronik 18/1995, pp. 50–58.

*Primary Examiner*—Melanie Kemper
*Attorney, Agent, or Firm*—Spencer & Frank

[57] ABSTRACT

An electrical home appliance (14) such as a dishwasher, a clothes dryer, a washing machine, a lighting arrangement, a heating system control or the like, which, via an interface arranged on or in the home appliance, can be connected to a bus system supplied to several home appliances and controlled by a single central control computer (17), with the interface being connected to a bus connection module for transmitting control commands and/or sensor signals between the bus system and the home appliance (14). The home appliance (14) additionally is provided with a plug-in position (18) for the detachable plugging in of the control computer (17). A contact configuration (19) establishing the connection between the plugged-in control computer (17) and the interface is arranged at the plug-in position (18). A great flexibility is accomplished since the control computer (17) can also be plugged in at the plug-in positions of other home appliances connected to the bus system. By changing the plug-in location of the control computer (17), the entire system can be controlled from different points. The control computer does not require a special location but is integrated into one of the home appliances when it is plugged in.

15 Claims, 1 Drawing Sheet

ELECTRICAL HOME APPLIANCE

REFERENCE TO RELATED APPLICATIONS

This application claims the priority of German application No. DE 1 96 15 840.0-32, filed Apr. 20, 1996, which is incorporated herein by reference.

BACKGROUND OF THE INVENTION

The invention relates to an electrical home appliance such as a dishwasher, a clothes dryer, a washing machine, a lighting arrangement, a heating system control or the like. More particularly, the present invention relates to an electrical home appliance such as dishwasher, clothes dryer, washing machine, lighting arrangement, heating system control or the like, which, via an interface arranged on or in the home appliance, can be connected to a bus system supplied to several home appliances and controlled by a single central control computer, with the interface being connected to a bus connection module for transmitting control commands and/or sensor signals between the bus system and the home appliance.

From the journal article "Das vernetzte Eigenheim"("The Networked Home"), Elektronik, vol. 18/1995, Meinrad Happacher, p. 50 to 58, it is known to connect a plurality of or all electrical home appliances to a home bus or data bus, with a personal computer (PC) also being connected to this home bus for the central control of these home appliances. The goal of such a central control of the home appliances is to enhance ecology, economy and safety in household work and, at the same time, provide relief from routine activities. With an intelligent control, savings are intended to be accomplished in particular in the heat and water supply and by making use of time-variable rates. At the same time, safety and functional reliability are intended to be increased as well, for example, by being able to constantly monitor fire, gas and water leakage protection sensors. The drawback of such a system is the relatively high investment and installation expenditure and the existing aversion of operators of home appliances to familiarizing themselves with a PC. Furthermore, there is often a lack of user-friendly software, so that reservations exist from the outset against the acquisition of such a system.

SUMMARY AND ADVANTAGES OF THE INVENTION

The above mentioned drawbacks and problems with the known home appliances which can be connected to a bus system are overcome or at least improved according to the present invention by an electrical home appliance such as dishwasher, clothes dryer, washing machine, lighting arrangement, heating system control or the like, which, via a respective interface arranged on or in the respective home appliance, can be connected to a bus system supplied to several home appliances and controlled by a single central control computer, with the interface being connected to a respective bus connection module for transmitting control commands and/or sensor signals between the bus system and the respective home appliance; and wherein the home appliance is provided with a plug-in position for the detachable plugging in of the control computer, and a contact configuration establishing the connection between the plugged-in control computer and the respective interface is arranged at the plug-in position.

In contrast to the prior known arrangements, the electrical home appliance according to the invention offers the advantage that the home appliance can, but may not be, connected to such a home bus system. A PC as a control computer is not necessary, and the control computer, which is adapted to a plug-in position of the home appliance, can be plugged in at this appliance or any other desired home appliance which also has such a plug-in position. Thus, the location of the central control option can be selected freely and can be changed easily at any time, which results in considerably greater flexibility. This means that the control computer need only be pulled out of the plug-in position of a home appliance and be plugged in at the plug-in position of another home appliance which might be in a more favorable position with respect to the central control. The resistance associated with operation of a PC, particularly the need of being experienced with the use of MS WINDOWS applications, is overcome by such an application-adapted control computer which, for example, might comprise the most important function keys directly and need only be designed for this intended application. The selection of the scope and the amenities of such a central control option is entirely open and variable. In order to get a start with such a networked system at low initial investments, such home appliances, for example, might first be operated without a bus system and without a control computer; the computer could then be acquired at a later time and would merely have to be plugged in at a plug-in position. The bus system can be installed later, for example, by installing lines on walls or in empty pipes or it might already be cost-efficiently incorporated into the initial design when a house is built and be put into operation only later once a control computer has been acquired and once a sufficient number of corresponding home appliances are in existence and connected to the bus. The arrangement, type and number of the home appliances can be selected in a virtually arbitrary manner, which means that the system that is designed is very variable. A special space or room for a control computer does not have to be provided since the control computer can be plugged in at different home appliances in a variable manner.

Advantageous modifications and improvements of the basic home appliance described are possible and are disclosed.

For example, the plug-in position of a home appliance is preferably designed as a plug-in slot in which, after its insertion, the control computer is arranged in a protected and integrated manner. In this configuration, the slot end surface on the inside of the home appliance advisably is provided with the contact configuration of the interface so that the connection with the interface and with power supply connections is established automatically when the control computer is inserted.

If the home appliance is not operated via a control computer or if the control computer is located in a different home appliance, it is advantageous to use a slot cover for covering the plug-in slot.

In order to be able to use and operate the control computer even when it is not plugged in at a home appliance, e. g., on top of the kitchen table, an adapter cable is provided to connect the control computer which is not arranged in the plug-in position with the contact configuration at the plug-in position.

Great variability is accomplished in that the control computer, which can be plugged in selectively at different home appliances, is designed for the control of all home appliances connected to the bus system, but the home appliances are also additionally provided with conventional control elements such as switches, keys, rotary knobs or the like for operating the home appliance independently of the control computer so that each appliance can be operated in the conventional manner, no matter whether it is connected to the bus system or not.

The modularly designed control computer has, in particular, an LC display and/or a numeric keyboard with function keys and/or an infrared receiver device and/or a synthetic language output device. Because of this modular design, it is possible to select arbitrary combinations of these functional units or a full version so that the investment costs can be selected to be variable here as well.

For wireless remote control, an infrared manual operation is advisably provided for the control and communication with the IR receiver device of the control computer. In this configuration, the control computer preferably has an infrared decoder to convert the signals of the infrared receiver device into bus telegrams.

It is advantageous to also provide the control computer with a device for the functional check, diagnosis and error search of all home appliances connected to the bus system.

So as to not lose any data when the position of the control computer is changed from one home appliance to another, the control computer is provided in an advantageous manner with a storage battery or a storage capacitor for the securing of data.

The bus connection modules in the individual home appliances are connected to sensors and/or actuators of the respective home appliance so that sensor signals can be transmitted to the control computer and control signals can be transmitted from the control computer to the actuators of the home appliance, which signals effect the desired control of the home appliance.

The EIB (European Installation Bus) is particularly suited as a bus system.

An embodiment of the invention is illustrated in the drawing and explained in greater detail in the description below.

DETAILED DESCRIPTION OF THE PREFERRED EMBODIMENT

Figure 1:
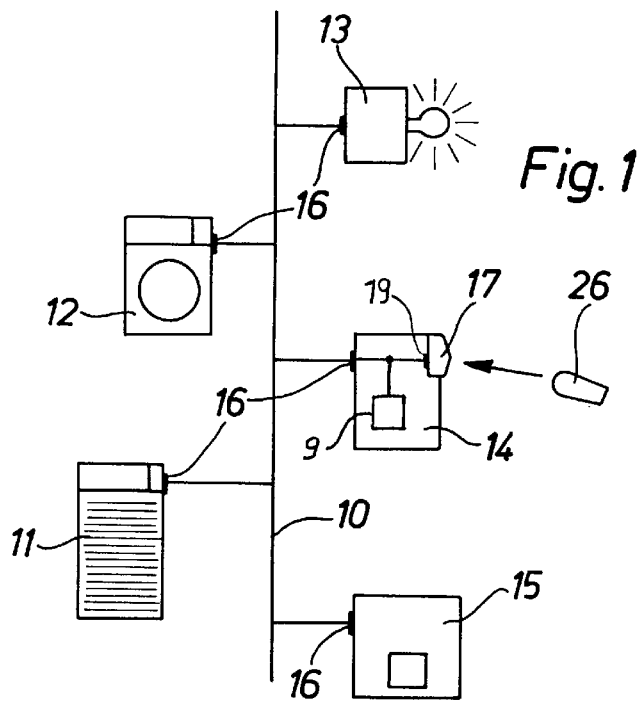
FIG. 1 is a schematic representation of a bus system having several home appliances, at least one of which is a home appliance according to the invention connected thereto.

According to FIG. 1, five electrical home appliances are connected to a bus system 10 which is a data bus configured, for example, as a standardized EIB (European Installation Bus). Of course, other known bus systems can also be used for this purpose, for example, a Bati-Bus, EHS, LON, CEBus, HBS or the like. The five connected home appliances are a control system for blinds 11, a washing machine 12, a lighting device 13, a dishwasher 14 and a control 15 of a heating system. Of course, these home appliances can also be multiply connected or still further home appliances can be connected to the bus system 10, for example, a clothes dryer, an alarm system, a ventilation system, a telephone system or the like. The bus system 10 is installed, for example, in a private home or apartment but, in principle, it can also be installed in other buildings.

In each case, the connection of the electrical home appliance 11–15 to the bus system 10 takes place, in a known manner, via a respective interface 16 which makes the respective connection to a respective bus connection module 9, in the respective home appliance. The actuators and sensors required for the respective home appliance are connected to this bus connection module 9, with control commands being supplied from the bus system 10 to the actuators, whereas the sensors emit their signals to the bus system 10 via the bus connection module 9 and the interface 16.

A central control computer 17 is used for the receiving and processing of the transmitter signals emitted to the bus system 10. This central computer 17 also generates the necessary control commands for all home appliances connected to the bus system 10. In the embodiment illustrated, this control computer 17 is positioned or plugged in at a plug-in slot 18 (see FIG. 2) of the dishwasher 14. With respect to their shapes, the plug-in slot 18 and the control computer 17 are configured such that, in its plugged-in state, the control computer 17 is flush with the outside wall of the dishwasher 14 and does not project beyond it. The connection to the bus system 10 takes place via a contact arrangement or configuration 19 e.g., a plug connector, on the inside end wall of the plug-in slot 18. This contact configuration 19 is connected to the interface 16 of this dishwasher 14 or it forms this interface. The electrical connection with the bus system 10 is established automatically via the interface 16 when the control computer 17 is inserted into the plug-in slot 18.

Instead of the plug-in slot 18, it is also possible, in principle, for other configurations of a plug-in position for the control computer 17 to be provided on the respective home appliance. The essential point is that all or at least several of the home appliances 11–15 connected to the bus system 10 are provided with such a plug-in slot 18 so that the control computer 17 can be pulled out of one home appliance and be plugged in at another home appliance without effecting a change in the control functions for the connected home appliances 11–15. This means that the control computer 17 can be positioned in the respectively most advantageous position for the user and its position can also be changed if another position later turns out to be more favorable.

In order to not suffer any data losses when the control computer 17 is to be plugged in at a different position, the control computer 17 is provided with a buffer memory or temporary power supply, for example, a storage battery or a storage capacitor. In the plugged-in position, the central computer 17 is supplied with the required electrical energy via the contact configuration 19.

Like the other home appliances 11–13 and 15 connected to the bus system 10, the dishwasher 14 is additionally provided with the conventional control elements 20 such as push-buttons, rotary knobs, control lamps and the like so that the desired operating functions can be carried out in the usual manner without the action of the control computer 17. This means that all home appliances 11–15 connected to the bus system 10 can also be operated without a control computer 17. The overall system can thus be built up in stages with low initial investments without a control computer 17 which can be added at a later time. The control then takes place selectively by hand and via the conventional control elements 20 or via the central control computer 17.

Figure 3:
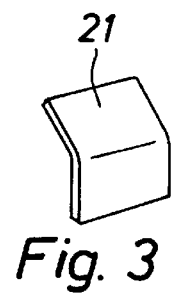
FIG. 3 shows a slot cover for covering the plug-in slot of the embodiment of the invention shown in FIG. 2 in the absence of the control computer.

If the plug-in slot 18 is empty, it can be covered by the slot cover 21 illustrated in FIG. 3 so that, on the one hand, the contact configuration 19 is protected against soiling and damage and, furthermore, a visually pleasing outside appearance of the dishwasher 17 or any other home appliance provided with such a plug-in slot 18 is accomplished.

It is also possible to operate the home appliances 11–15 connected to the bus system 10 by means of the control computer 17 which is not inserted into the plug-in slot 18. For this purpose, the contact configuration 19 of one of the home appliances must be connected to the control computer 17 by means of a cable, not shown. The control computer 17 can then be arranged on a table or console disposed next to the home appliance.

Figure 2:
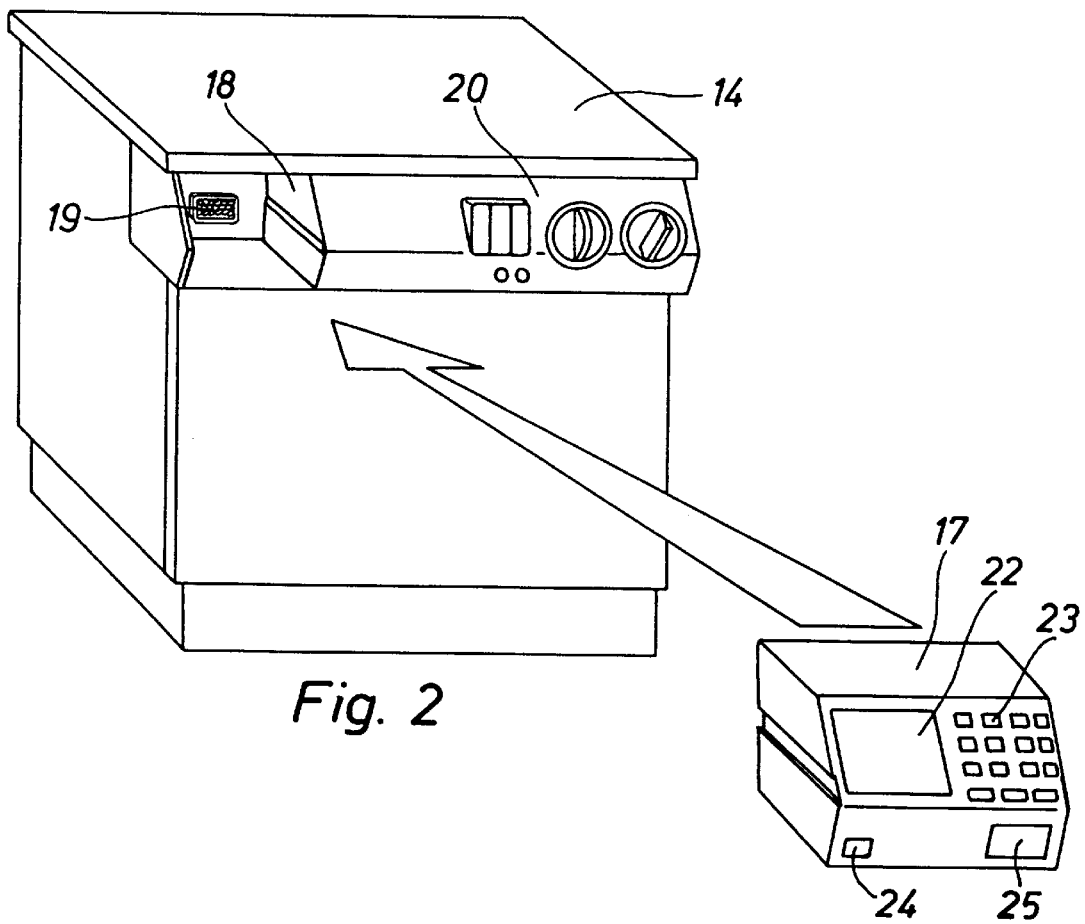
FIG. 2 is a perspective representation of a home appliance, configured as a dishwasher, having an insertion slot for a control computer, which is also shown in perspective according to the invention.

The control computer 17 illustrated in FIG. 2 has a modular design and comprises an LC display 22, a numeric keyboard 23 with function keys, an infrared (IR) receiver 24 and a loudspeaker 25 for synthetic language output. While the full version shown in FIG. 2 comprises all of these elements, only some of them may be available in simpler versions, e. g., only a numeric keyboard 23, or only an IR receiver 24 with the control then taking place via an IR remote control device 26 (see FIG. 1). In these instances, the IR receiver 24 only comprises an IR decoder for converting the received IR signals into bus telegrams.

The application program in the control computer 17 for controlling and polling the actuators and sensors in the individual home appliances 11–15 connected to the bus system 10 can also be stored, for example, in a memory, not shown, such as an EPROM/EEPROM. The corresponding software is menu-driven such that the operation of the numeric keyboard 23 is possible in a simple manner in combination with a few special keys. Additionally, the program can execute a functional check, diagnosis and error search in the home appliances connected to the bus system 10. In this manner, it is possible to display errors and information on how the customer himself can eliminate errors, as well as for customer service to do a remote diagnosis via a modem if an appropriate connection exists.

The invention now being fully described, it will be apparent to one of ordinary skill in the art that any changes and modifications can be made thereto without departing from the spirit or scope of the invention as set forth herein.

What is claimed:

1. An electrical home appliance, including a dishwasher, clothes dryer, washing machine, lighting arrangement, heating system control, having an interface, which is arranged on the respective home appliance, for connecting the home appliance to a bus system connected to several home appliances for control by a single central control computer, with the interface being connected to a bus connection module within the respective home appliance for transmitting control commands or sensor signals between the bus system and the home appliance; and wherein the respective home appliance is provided with a plug-in position for the detachable plugging in of the control computer, and a contact configuration is provided at the plug-in position and connected to the interface for establishing a connection between a plugged-in control computer and the interface.

2. A home appliance according to claim 1, wherein the plug-in position is configured as a plug-in slot for at least partially receiving the control computer.

3. A home appliance according to claim 2, wherein the contact configuration is disposed on an end wall of the slot on the inside of the home appliance and has a contact configuration corresponding to that of the interface.

4. A home appliance according to claim 2, further comprising a slot cover for covering the plug-in position configured as a plug-in slot in the absence of the control computer.

5. A home appliance according to claim 1, further comprising an adapter cable for connecting a control computer not arranged at the plug-in position, with the contact configuration at the plug-in position.

6. A home appliance according to claim 1, wherein the control computer, which can be selectively plugged in at different home appliances, is designed for controlling all of the home appliances connected to the bus system.

7. A home appliance according to claim 1, wherein the home appliance is additionally provided with conventional control elements, including at least one of switches, keys, and rotary knobs, for operating the home appliance independently of the control computer.

8. A home appliance according to claim 1, wherein the contact configuration at the plug-in position additionally has contacts for connecting a power supply to the control computer.

9. A home appliance according to claim 1, wherein the control computer is modularly designed and includes at least one of an LC display, a numeric keyboard having function keys, an IR receiver device, and a synthetic language output device.

10. A home appliance according to claim 9, wherein the control computer has an IR receiver device for receiving IR signals from an external IR controller for IR manual operation for the control of and communication with the IR receiver device.

11. A home appliance according to claim 10, wherein the control computer has an IR decoder for converting signals of the IR receiver device into bus telegrams for transmission via the bus system.

12. A home appliance according to claim 1, wherein the control computer includes means for carrying out at least one of a functional check, a diagnosis and an error search of all home appliances connected to the bus system via the bus system.

13. A home appliance according to claim 1, wherein the control computer is provided with a storage battery or a storage capacitor for the maintenance of data during a position change of the control computer.

14. A home appliance according to claim 1, wherein the bus connection module is connected to sensors or actuators of the respective home appliance.

15. A home appliance according to claim 1, wherein the bus system is configured as an EIB (European Installation Bus) bus system.

* * * * *